Sept. 12, 1944.  J. A. GRANT  2,357,892
EGG CLEANING APPARATUS
Filed March 17, 1941   3 Sheets-Sheet 1
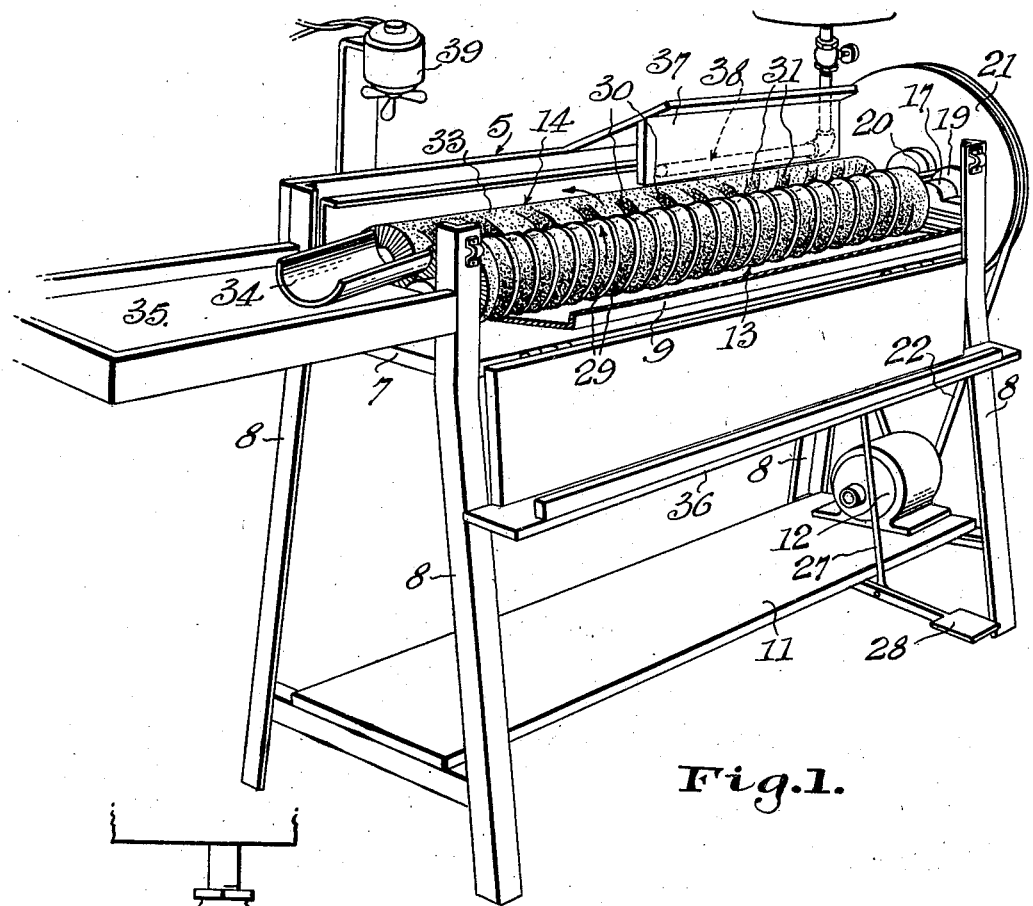
Fig.1.
Fig.4.
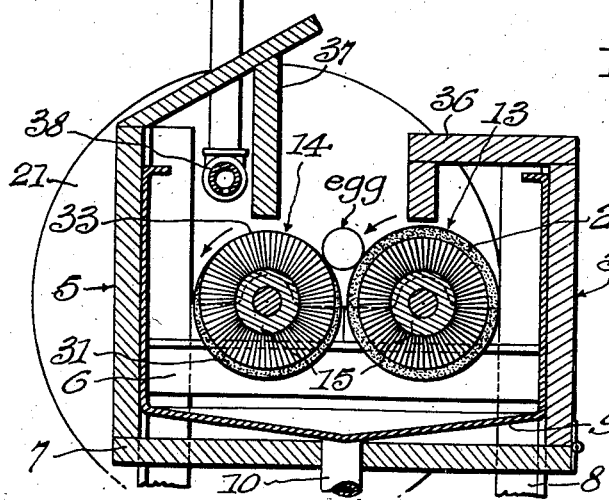
Inventor
John A. Grant
Baldwin & Wight
his Attorneys Sept. 12, 1944.    J. A. GRANT    2,357,892
EGG CLEANING APPARATUS
Filed March 17, 1941    3 Sheets-Sheet 2
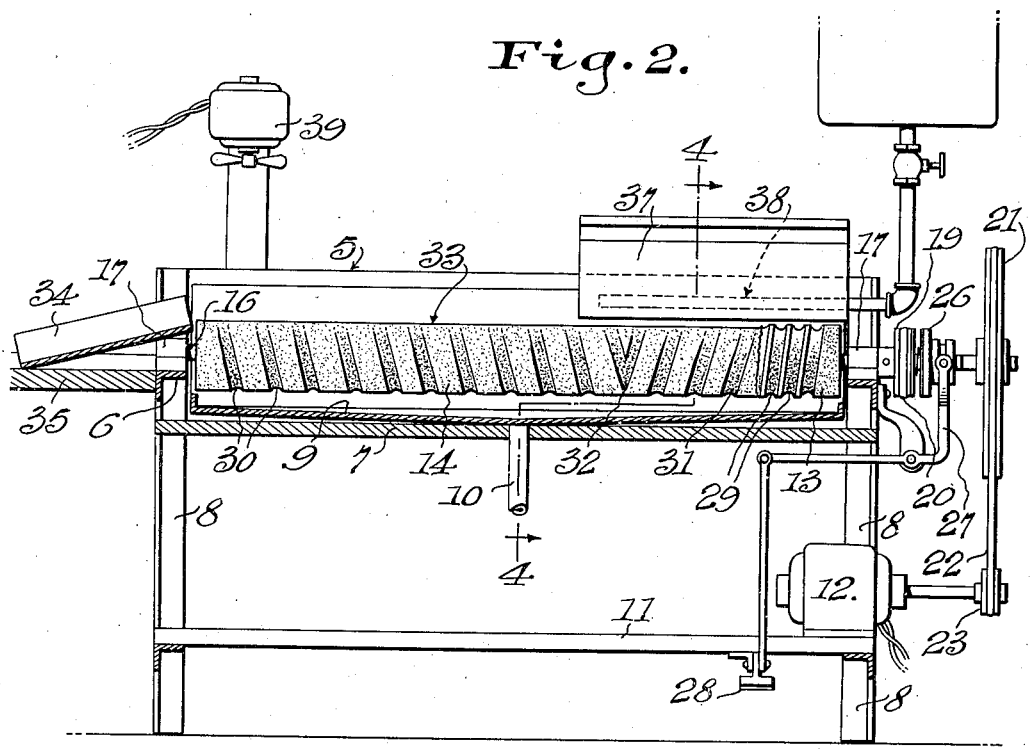
Fig. 2.
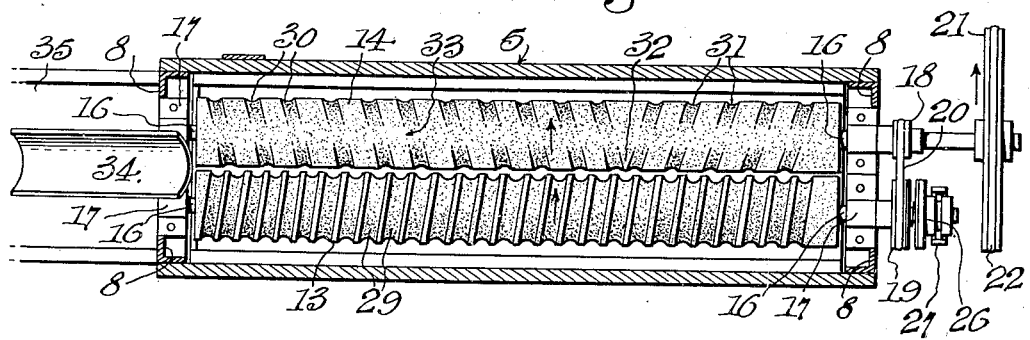
Fig. 3.
Fig. 5.
Inventor
John A. Grant
By Baldwin & Wight
his Attorneys Sept. 12, 1944.   J. A. GRANT   2,357,892
EGG CLEANING APPARATUS
Filed March 17, 1941   3 Sheets-Sheet 3

Inventor
John A. Grant
By Baldwin & Wight
his Attorneys

Patented Sept. 12, 1944

2,357,892

UNITED STATES PATENT OFFICE 2,357,892

EGG CLEANING APPARATUS

John A. Grant, Tampa, Fla.

Application March 17, 1941, Serial No. 383,823

16 Claims. (Cl. 146—198)

The invention relates generally to the art of brushing, scrubbing and cleaning, and primarily seeks to provide a novel apparatus capable of efficiently cleaning eggs and which is simple in construction and operation and can be manufactured at low cost.

I am aware that attempts have been made heretofore to design egg cleaning mechanisms, but all such mechanisms of which I have knowledge have been found objectionable because of the complicated and expensive nature thereof, because of the likelihood of wastage of eggs by breakage or defective surface treatment, or because of inefficiency in the egg surface cleaning function thereof. It is my purpose to provide an improved egg cleaning machine structure which will avoid all of these disadvantages.

In its more detailed nature, the invention resides in the provision of a novel egg cleaning machine structure including two egg cleaning rotors disposed with their axes parallel and close together so as to support eggs on and between said rotors, one said rotor being normally held stationary while the other rotates, means being provided for causing said normally stationary rotor to rotate at times with the other rotor, and means also being provided for spraying at intervals a portion only of one of the rotors with a fluid effective to facilitate the cleaning function.

An object of the invention is to provide a machine of the character stated in which the rotors preferably but not necessarily comprise long generally cylindrical brushes which rotate at times in unison with eggs supported on and between them, one said rotor having a groove spiral or helix cut therein which tends in part at least to feed eggs in one direction, and the other of said rotors having a groove spiral cut therein which tends in part at least to feed eggs in the opposite direction.

Another object of the invention is to provide a machine of the character stated in which the spiral groove in the at times stationary rotor preferably but not necessarily is deeper than the groove in the other rotor, and in which said other rotor preferably but not necessarily has an eccentric egg engaging surface, said deep spiral groove serving when that rotor is stationary to provide egg holding pockets and when that rotor is rotating to dominate the opposing rotor groove and effect a longitudinal feeding of eggs, and the eccentricity and grooving of said other rotor serving to assure the desired tumbling and thorough brush cleaning of the eggs.

Another object of the invention is to provide a machine of the character stated including an egg holder and carrier brush having a spiral or helical groove therein effective to form egg holding pockets while the brush is stationary and effective to impart cleaned egg discharge travel when rotated, and one or more constantly rotated cleaner brushes equipped with mutilated or non-continuous spiral grooving effective to agitate eggs held by the holder and carrier brush in a manner for asuring slow turning of the eggs during the cleaning function.

Another object of the invention is to provide a machine of the character stated including a constantly rotated cleaner brush having spiral grooving therein extending in one direction throughout a portion of the length thereof and in another direction in another portion of the length thereof.

Another object of the invention is to provide a machine of the character stated in which the eccentric brush is constantly rotated and has the cleaning fluid applied to a portion only thereof adjacent the egg receiving end of the machine, thereby permitting the remainder of the brush to engage the eggs in dry brushing contact.

With the above and other objects in view which will more fully appear, the nature of the invention will be more clearly understood by following the description, the appended claims, and the several views illustrated in the accompanying drawings.

In the drawings:

Figure 1 is a perspective view illustrating the machine, one side wall being lowered and the drip pan being shown in section.

Figure 2 is a central vertical longitudinal section of the machine.

Figure 3 is a plan view of the machine.

Figure 4 is a vertical cross section taken on the line 4—4 on Figure 2.

Figure 5 is a fragmentary longitudinal sectional view illustrating the clutch.

Figure 6:
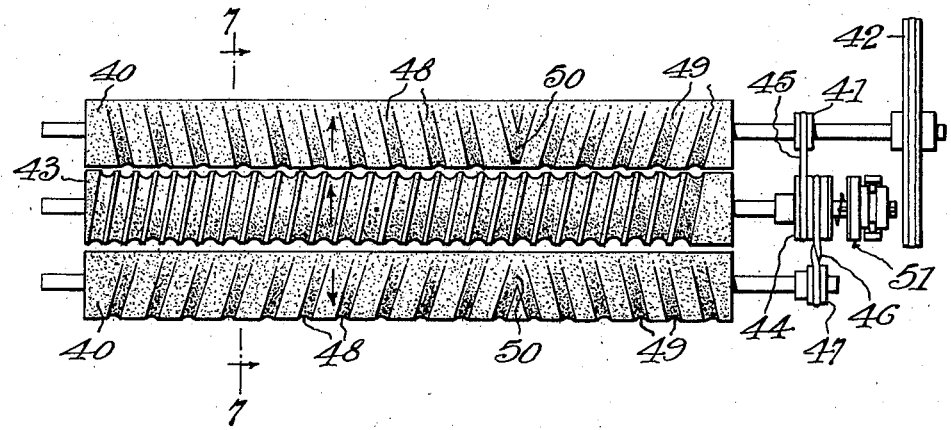
Figure 6 is a plan view illustrating a modified form of the invention.

In the example of embodiment of the invention herein disclosed, there is included a trough-like box or body having sides 5, end frame pieces 6, and a bottom 7. The body is supported on legs or corner standards 8 and may include a drip pan 9 with a body drain 10 if found desirable. A shelf 11 may be supported by the corner standards 8 and a driving motor 12 is mounted on said shelf.

Two rotors 13 and 14, preferably in the form of long generally cylindrical brushes, are provided, the bristles of the brushes extending radially from cores 15. The trunnions 16 of the rotors are mounted in suitable bearings 17, and both trunnions at the receiving end of the machine are extended beyond their bearings and carry pulleys 18 and 19 over which a transmission belt 20 passes. The pulley 19, which serves at times to drive the egg holder or carrier rotor 13, preferably but not necessarily is twice the size of the pulley 18 which is mounted on the trunnion of the rotor 14, and with the pulleys thus proportioned, when the rotors are connected to rotate in unison in a manner later to be described, the rotors or brushes will rotate in unison, preferably clockwise looking toward the discharge end of the machine, and the brush 13 will rotate at half the speed of the brush 14. During the cleaning of the eggs, the eggs are supported on and between the brushes 13 and 14, or, in other words, said eggs rest in the crotch formed between the adjacent rotors. See Figure 4. While the stated brush speed ratio is preferred, it is to be understood that the brushes can be operated effectively at other speeds and the brush speeds can be varied to suit the demands of different operators.

The projected trunnion of the rotor 14 carries a large pulley 21 to which rotation is imparted through the driver belt 22 from the small drive pulley 23 of the motor 12. Thus the egg cleaning rotor 14 is constantly rotated, preferably but not necessarily at a speed of approximately 150 revolutions per minute.

A clutch surface 24 is formed on the pulley 19 and this pulley loosely surrounds the trunnion extension of the rotor 13 and is opposed by the clutch surface 25 formed on the shiftable clutch element 26 which is splined to said trunnion extension and is shiftable through the medium of the movement transmitting connections 27 and the depressible treadle member 28. It will be obvious that each time the treadle 28 is depressed the clutch surfaces 25 and 24 will be caused to engage and the rotation of the loose pulley 19 will be transmitted to the egg holder or carrier rotor or brush 13. During the operation of the machine the rotor 14 rotates constantly but the clutch is actuated to impart rotation to the rotor 13 intermittently, that is, the rotor 13 is permitted to remain stationary for an interval during which the eggs are tumbling about and being thoroughly brush-cleaned on said rotors, and then is caused to rotate to effect a feeding away of the cleaned eggs and the vacating of egg receiving pockets in order to condition them for receiving a new charge of eggs.

The rotor 13 is equipped with a deep spiral or helical groove 29 which is so directed, according to the direction of rotation of the rotor, as to constantly tend to feed eggs toward the discharge end of the machine. While the invention is not limited beyond the scope of the appended claims to the use of bristle brushes, to any particular direction of rotation or grooving, or to any precise dimensions of groove, it is preferred to use bristle brushes and to provide brushes substantially 5" in diameter, the brush 13 having a groove of 2" pitch, 1½" wide and ⅝" to ¾" deep. It is preferred to rotate both brushes clockwise, as previously stated, and when so rotated the brush 13 is equipped with a left hand spiral groove. A mutilated or non-continuous groove is formed in the brush 14 but this groove is shallow and preferably has a higher pitch. I have found it desirable to provide a groove 1½" wide and approximately ⅜" deep and having a pitch of 4". While the stated dimensions are preferred, the invention is not to be considered limited to these or any specific dimensions of brushes and grooves. The two-thirds of the length of this groove nearest the discharge end of the machine is a right hand spiral 30, and the one-third of the length of this groove nearest the loading end of the machine is a left hand spiral 31, the two spiral portions meeting at the point 32. These spiral groove directions pertain when the brush 13 is to be rotated clockwise as stated, and it is to be understood that this grooving and the direction of brush rotation can be changed to meet particular installation demands without departing from the scope of the invention.

The mutilation or lack of uniformity of depth of the grooving 30, 31 preferably but not necessarily is provided in this wise. It will be noted that the brush 14 has its peripheral surface eccentrically disposed with respect to the axis of the brush, and by thus eccentrically shaping the brush after the grooving 30, 31 has been cut therein, the grooving is considerably reduced in depth at one side of the brush or the brush is rendered completely smooth at that side as indicated at 33.

Eggs which have been cleaned and discharged from the machine are discharged through a chute 34 into a receiving box or end extension 35.

An egg guard 36 is disposed above the axis along the whole of the brush 13 at one side of the machine, and a guard member 37 is disposed over the axis of the receiving or loading end portion only of the brush 14. These guard members serve to prevent any eggs from passing over and dropping behind the brushes as a result of crowding of the eggs.

Means 38 is provided for spraying a fluid onto the receiving end portion of the brush 14, thereby to facilitate the cleaning action. The spraying is accomplished with a sodium silicate solution and at intervals only so that the major portion of the length of the brush 14 may remain dry and act as a drying medium as the cleaned eggs move therealong during the egg discharging function. If desired, a fan 39 can be provided at the discharge end of the machine to facilitate drying of the cleaned eggs.

With the brushes shaped and proportioned in the manner herein described, the deep grooves in the normally stationary brush 13 serve as pockets in which the eggs are held while they are being agitated and brushed thoroughly by the eccentric, grooved brush 14. These pockets are so dimensioned that the eggs in adjacent pockets contact slightly at their ends and it is found that this slight contact facilitates the end-over-end tumbling of the eggs so that a thorough cleaning of every portion of each egg is assured. The mutilated spirals on the cleaner brush 14 impart slight kicks to the eggs in one direction or another and facilitate movement of the eggs in the brush grooves or pockets effective to assure thorough cleaning of the eggs.

In operating the machine the motor is started so as to impart rotation to the constantly rotating rotor 14. The rotor 13 remains stationary and the operator places a batch of, say five or six, eggs in the crotch between the receiving ends of the brushes 13 and 14, a small amount of the cleaning fluid being permitted to spray onto the brush 14. After a short cleaning interval during which the eggs tumble about in the pockets formed by the groove in the brush 13, the operator steps on the treadle 28 to shift the clutch and impart rotation to the brush 13, preferably but not necessarily, at half the speed of the constantly rotating brush 14.

The reversed spiral groove portions 30, 31 of the cleaning brush or rotor 14 tend to move the eggs in opposite directions, the longer grooving portion 30 tending to move the eggs toward the loading end of the machine and the shorter grooving portion 31 tending to move the eggs in the discharge direction or toward the chute 34. Thus the reversed spiral portions work against each other and aid in holding eggs in position in the pockets formed by the groove in the stationary brush 13. By reason of the position of these reversed spiral portions and the preferred relative rotation of the carrier brush 13 so that the portion thereof adjacent the cleaning brush moves downwardly when the same is rotated for discharging cleaned eggs, jumping and undesirable displacement of cleaned eggs is prevented. When the carrier brush 13 is rotated, its relatively deep spiral groove is dominant and causes an outfeeding of cleaned eggs over the discharging chute 34 into the collecting trough 35.

Each time the operator steps on the treadle to discharge or feed away a batch of cleaned eggs, he reaches over to a supply and picks up another batch of eggs to be cleaned and deposits them at the loading ends of the brushes as he again removes his foot from the treadle and permits the brush 13 to come to rest and perform its egg holding function during another egg cleaning interval. The terms right and left hand, clockwise and anticlockwise, as herein used to describe the spiral grooves and brush movements, are to be considered relative terms, for it will be obvious that the direction of rotation of the respective brushes can be altered without departing from the scope of the invention, and the direction of the spiral grooves will be altered accordingly as the direction of rotation of the brushes is altered so as to maintain the cooperative relation of the parts as hereinbefore stressed.

Figure 7:
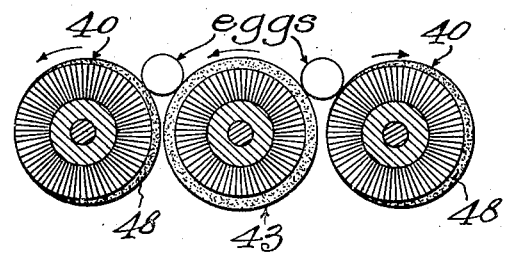
Figure 7 is a vertical cross sectional view taken on the line 7—7 on Figure 6.

In Figures 6 and 7 of the drawings, there is illustrated a modified arrangement of the brushes, and in this modified arrangement a single carrier or holder brush is employed in combination with two cleaner brushes. The constantly rotating cleaning brushes are generally designated 40 and one thereof has affixed thereto a driving pulley 41 and has rotation imparted thereto directly or indirectly from the large driving pulley 42. The single carrier or holder brush 43 is disposed between the cleaner brushes 40 and has a double pulley 44 loosely mounted on a trunnion thereof. Rotation is imparted to the loose pulley from the aforementioned pulley 41 by a transmission belt 45, and a twisted transmission belt connection 46 between the loose pulley and a pulley 47 on a trunnion of the other cleaner brush 40 serves to impart rotation to the latter. Thus the cleaner brushes 40 are rotated constantly and in opposite directions, so that the opposed or innermost surfaces of these brushes move upwardly, as illustrated in Figure 7.

The cleaner brushes 40 are, in this particular illustration, similar in form and each includes a major length spiral groove portion 48 directed so as to tend to move eggs toward the receiving end of the machine and extending throughout the two-thirds length portion thereof adjacent the discharge end, and a minor length spiral groove portion 49 extending throughout the one-third length portion thereof at the loading end and directed so as to tend to move eggs toward the discharging end of the machine, said reversely directed spiral groove portions of the respective brushes 40 meeting at a point 50.

As in the form of the invention previously described, the carrier or holder brush remains stationary during the egg cleaning interval and has rotation imparted thereto only when it is desired to feed cleaned eggs out of the machine. In order to provide for imparting this intermittent rotation to the brush 43 the trunnion thereof which supports the loose pulley 44 has a clutch element 51 splined thereon which is shiftable into and out of frictional contact with a clutch surface on the loose pulley. It will be obvious that each time the clutch element 51 is engaged with the loose pulley 44, the rotation of the latter will be imparted to the brush 43, and it will be observed by reference to Figure 7 that the adjacent surfaces of the brushes 40 constantly move upwardly. By thus moving the opposed surfaces of the brushes 40 upwardly, forcing of eggs downwardly between brushes during intervals of rest of the brush 43 is avoided.

In this modified arrangement of the brushes, two egg receiving and supporting crotches are provided and the intermittently rotated carrier or holder brush 43 cooperates with each of the constantly rotating cleaner brushes 40 in the same manner as previously described except for the fact that the effective surface thereof adjacent one said cleaner brush will be moved downwardly whereas the effective surface at the opposite side of the brush will be moved upwardly during an egg discharge interval. In each case. however, the grooving of the carrier brush 43 will be dominant and effective to cause the cleaned eggs to move longitudinally of the brushes and be discharged at the discharging end of the machine.

It is of course to be understood that the details of structure and arrangement of parts may be variously changed and modified without departing from the spirit and scope of my invention.

I claim:

1. In an egg cleaning machine, a pair of generally cylindrical rotors having yieldable surfaces and disposed in side by side relation to provide therebetween a longitudinal crotch in which to receive eggs to be cleaned, and means for at least at times rotating one rotor much more rapidly than the other rotor thereby to moderately agitate and tumble eggs supported between said rotors and engage them in surface wiping and cleaning contact, said more rapidly rotated rotor having its peripheral surface disposed eccentrically with respect to its axis.

2. In an egg cleaning machine, a pair of generally cylindrical rotors having yieldable surfaces and disposed in side by side relation to provide therebetween a longitudinal crotch in which to receive eggs to be cleaned, means for constantly rotating one rotor, and means for rotating the other rotor at intervals only at the will of an operator, said constantly rotated rotor having its peripheral surface disposed eccentrically with respect to its axis and the other rotor having a deep spiral groove in its peripheral surface effective when the rotor is at rest to form egg seating pockets and when the rotor is in rotation to feed cleaned eggs along the rotors to be discharged from the machine.

3. In an egg cleaning machine, a pair of generally cylindrical rotary brushes disposed in side by side relation to provide therebetween a longitudinal crotch in which to receive eggs to be cleaned, means for constantly rotating one brush, selectively operable means for rotating the other brush simultaneously with the rotation of said one brush, and means for rendering said selectively operable means effective to thereby cause said other brush to rotate simultaneously with said one brush or ineffective so as not to rotate said other brush while said one brush continues to rotate, said brushes having spiral grooves in the peripheries thereof which are at least in part reversely directed and effective when the brushes are in rotation to tend to move eggs in opposite directions, the grooving in the brush rotated at intervals being directed continuously in one direction and being deeper than the grooving in the constantly rotated rotor so as to be dominant to impart discharge movement to cleaned eggs when rotated.

4. In an egg cleaning machine, a pair of generally cylindrical rotary brushes disposed in side by side relation to provide therebetween a longitudinal crotch in which to receive eggs to be cleaned, means for constantly rotating one brush, selectively operable means for rotating the other brush simultaneously with the rotation of said one brush, and means for rendering said selectively operable means effective to thereby cause said other brush to rotate simultaneously with said one brush or ineffective so as not to rotate said other brush while said one brush continues to rotate, said constantly rotated brush having its peripheral surface disposed eccentrically with respect to its axis.

5. In an egg cleaning machine, a pair of generally cylindrical rotary brushes disposed in side by side relation to provide therebetween a longitudinal crotch in which to receive eggs to be cleaned, means for constantly rotating one brush, selectively operable means for rotating the other brush simultaneously with the rotation of said one brush, and means for rendering said selectively operable means effective to thereby cause said other brush to rotate simultaneously with said one brush or ineffective so as not to rotate said other brush while said one brush continues to rotate, said brushes having spiral grooves in the peripheries thereof, said constantly rotated brush having its peripheral surface disposed eccentrically with respect to its axis and having its helical groove extending in one direction throughout its length.

6. In an egg cleaning machine, a pair of generally cylindrical rotary brushes disposed in side by side relation to provide therebetween a longitudinal crotch in which to receive eggs to be cleaned, means for constantly rotating one brush, and means for rotating the other brush at intervals only at the will of an operator, said brushes having spiral grooves in the peripheries thereof, said constantly rotated brush having its peripheral surface disposed eccentrically with respect to its axis and the bottom of the spiral groove therein spaced like distances from said axis at all points thereby to provide grooving of greater depth at one side thereof than at the opposite side.

7. In an egg cleaning machine, a pair of generally cylindrical rotary brushes disposed in side by side relation to provide therebetween a longitudinal crotch in which to receive eggs to be cleaned, means for constantly rotating one brush, and means for rotating the other brush at intervals only at the will of an operator, said constantly rotated brush having its peripheral surface disposed eccentrically with respect to its axis and having a shallow spiral groove formed therein, and the other brush having a deep spiral groove in its peripheral surface effective when it is at rest to form egg seating pockets and when in rotation to feed cleaned eggs along the crotch to be discharged from the machine.

8. In an egg cleaning machine, a pair of generally cylindrical rotary brushes disposed in side by side relation to provide therebetween a longitudinal crotch in which to receive eggs to be cleaned, means for constantly rotating one brush, and means for rotating the other brush at intervals only at the will of an operator, said constantly rotated brush having its peripheral surface disposed eccentrically with respect to its axis and having a shallow spiral groove formed therein, and the other brush having a deep spiral groove in its peripheral surface effective when it is at rest to form egg seating pockets and when in rotation to feed cleaned eggs along the crotch to be discharged from the machine.

9. In an egg cleaning machine, a pair of generally cylindrical rotary brushes disposed in side by side relation to provide therebetween a longitudinal crotch in which to receive eggs to be cleaned, means for constantly rotating one brush, and means for rotating the other brush at intervals only at the will of an operator, said constantly rotated brush having its peripheral surface disposed eccentrically with respect to its axis and having a shallow spiral groove formed therein with the bottom of the groove spaced like distances from said axis at all points thereby to provide grooving of greater depth at one side thereof than at the opposite side, and the other brush having a deep spiral groove in its peripheral surface effective when it is at rest to form egg seating pockets and when in rotation to feed cleaned eggs along the crotch to be discharged from the machine.

10. In an egg cleaning machine, a pair of generally cylindrical rotary brushes disposed in side by side relation to provide therebetween a longitudinal crotch in which to receive eggs to be cleaned, means for constantly rotating one brush, selectively operable means for rotating the other brush simultaneously with the rotation of said one brush, and means for rendering said selectively operable means effective to thereby cause said other brush to rotate simultaneously with said one brush or ineffective so as not to rotate said other brush while said one brush continues to rotate, said brushes having spiral grooves in the peripheries thereof which are in part at least reversely directed, the groove in said other brush extending in one direction throughout the length of the brush and being deeper than the groove in said one brush so as to be dominant to impart discharge movement to cleaned eggs when rotated, and means for depositing a cleaning fluid on a limited portion only of one brush at the end thereof opposite the end toward which said deeper groove discharges the eggs.

11. In an egg cleaning machine, a pair of generally cylindrical rotary brushes disposed in side by side relation to provide therebetween a longitudinal crotch in which to receive eggs to be cleaned, means for constantly rotating one brush, selectively operable means for rotating the other brush simultaneously with the rotation of said one brush, and means for rendering said selectively operable means effective to thereby cause said other brush to rotate simultaneously with said one brush or ineffective so as not to rotate said other brush while said one brush continues to rotate, said constantly rotated brush having its peripheral surface disposed eccentrically with respect to its axis, and means for depositing a cleaning fluid on a limited portion only of the constantly rotated brush.

12. In an egg cleaning machine, a pair of generally cylindrical rotary brushes disposed in side by side relation to provide therebetween a longitudinal crotch in which to receive eggs to be cleaned, means for constantly rotating one brush, means for rotating the other brush at intervals only at the will of an operator, said constantly rotated brush having its peripheral surface disposed eccentrically with respect to its axis and having a shallow spiral groove formed therein, and the other brush having a deep spiral groove in its peripheral surface effective when it is at rest to form egg seating pockets and when in rotation to feed cleaned eggs along the crotch to be discharged from the machine, means for depositing a cleaning fluid on a limited portion only of the constantly rotated brush, a guard member disposed above the axis of and along the intermittently rotated brush effective to prevent passage of eggs transversely over said intermittently rotated brush, and a guard member similarly extending over the fluid treated part of the constantly rotated brush.

13. In an egg cleaning machine, a pair of generally cylindrical rotors having yieldable surfaces and disposed in side by side relation to provide therebetween a longitudinal crotch in which to receive and mutually engage in cleaning contact eggs to be cleaned, means for constantly rotating one rotor, selectively operable means for rotating the other rotor more rapidly than said one rotor, and means for rendering said selectively operable means effective to thereby rotate said other rotor or ineffective so as not to rotate said other rotor while said one rotor continues to rotate, said other rotor having a mutilated spiral groove formed in the periphery thereof.

14. In an egg cleaning machine, a pair of generally cylindrical rotors having yieldable surfaces and disposed in side by side relation to provide therebetween a longitudinal crotch in which to receive and mutually engage in cleaning contact eggs to be cleaned, means for constantly rotating one rotor, selectively operable means for rotating the other rotor more rapidly than said one rotor, and means for rendering said selectively operable means effective to thereby rotate said other rotor or ineffective so as not to rotate said other rotor while said one rotor continues to rotate, said other rotor having spiral grooving in the peripheral surface thereof extending in part as a right hand spiral and in part as a left hand spiral.

15. In an egg cleaning machine, a pair of generally cylindrical rotary brushes disposed in side by side relation to provide therebetween a longitudinal crotch in which to receive and mutually engage in cleaning contact eggs to be cleaned, means for constantly rotating one brush, selectively operable means for rotating the other brush simultaneously with the rotation of said one brush, and means for rendering said selectively operable means effective to thereby cause said other brush to rotate simultaneously with said one brush or ineffective so as not to rotate said other brush while said one brush continues to rotate, said constantly rotated brush having a shallow mutilated spiral groove formed therein, and the other brush having a deep spiral groove in its peripheral surface directed continuously in one direction and being effective when it is at rest to form egg seating pockets and when in rotation to feed cleaned eggs along the crotch to be discharged from the machine.

16. In an egg cleaning machine, an egg holding and carrying brush having a continuous spiral groove in its periphery, a cleaner brush disposed at each side of the first mentioned brush and each cleaner brush forming with said first mentioned brush a longitudinal crotch in which to receive and mutually engage in cleaning contact eggs to be cleaned, means for constantly rotating both cleaner brushes, selectively operable means for rotating said first mentioned brush simultaneously with the rotation of said cleaner brushes, and means for rendering said selectively operable means effective to thereby cause said first mentioned brush to rotate simultaneously with said cleaner brushes or ineffective so as not to rotate said first mentioned brush while said cleaner brushes continue to rotate, each said cleaner brush having egg agitating peripheral portions effective during at rest intervals of the first mentioned brush to impart turning movement to eggs engaged thereby, and said continuous spiral groove being effective when said first mentioned brush is stationary to form egg holding pockets and when in motion to impart discharging movement to cleaned eggs.

JOHN A. GRANT.